United States Patent
Lee

(10) Patent No.: US 11,486,995 B2
(45) Date of Patent: Nov. 1, 2022

(54) SYSTEMS AND METHODS FOR A RADAR SYSTEM USING SECTIONAL THREE-DIMENSIONAL BEAMFORMING

(71) Applicant: Toyota Motor Engineering & Manufacturing North America, Inc., Plano, TX (US)

(72) Inventor: Jae Seung Lee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 118 days.

(21) Appl. No.: 16/939,382

(22) Filed: Jul. 27, 2020

(65) Prior Publication Data

US 2022/0026555 A1    Jan. 27, 2022

(51) Int. Cl.
| | | |
|---|---|---|
| *G01S 13/42* | (2006.01) | |
| *H01Q 1/32* | (2006.01) | |
| *H01Q 21/06* | (2006.01) | |
| *G01S 13/931* | (2020.01) | |

(52) U.S. Cl.
CPC .......... *G01S 13/426* (2013.01); *G01S 13/931* (2013.01); *H01Q 1/3208* (2013.01); *H01Q 21/067* (2013.01)

(58) Field of Classification Search
CPC ...... G01S 13/426; G01S 13/931; G01S 13/42; G01S 7/03; H01Q 1/3208; H01Q 21/067; H01Q 25/00; H01Q 3/24; H01Q 21/06; H01Q 1/32
See application file for complete search history.

(56) References Cited

U.S. PATENT DOCUMENTS

| | | | |
|---|---|---|---|
| 6,061,035 A | 5/2000 | Kinasewitz et al. | |
| 9,116,227 B2 | 8/2015 | Lee et al. | |
| 9,397,740 B2* | 7/2016 | Maltsev | H01Q 21/0006 |
| 9,917,355 B1 | 3/2018 | Lee et al. | |
| 10,141,636 B2 | 11/2018 | Lee | |
| 10,613,216 B2 | 4/2020 | Vacanti et al. | |
| 2005/0266902 A1 | 12/2005 | Khatri et al. | |
| 2014/0225805 A1 | 8/2014 | Pan et al. | |
| 2015/0303587 A1 | 10/2015 | Pan | |

(Continued)

OTHER PUBLICATIONS

Gu, et al., "A multilayer organic package with four integrated 60GHz antennas enabling broadside and end-fire radiation for portable communication devices," 2015 Electronic Components & Technology Conference, May 2015, pp. 1005-1009.

(Continued)

*Primary Examiner* — Bernarr E Gregory
*Assistant Examiner* — Yonghong Li
(74) *Attorney, Agent, or Firm* — Christopher G. Darrow; Darrow Mustafa PC

(57) ABSTRACT

System, methods, and other embodiments described herein relate to scanning a surrounding environment of a vehicle by radar during automated driving. In one embodiment, a method includes detecting an object by using a three-dimensional beam formed by a layered array of end-fire antennas. The method also includes scanning the object by using a fine three-dimensional beam formed by a section of the layered array of end-fire antennas. The method also includes tracking the object by using the fine three-dimensional beam.

20 Claims, 10 Drawing Sheets

(56) References Cited

U.S. PATENT DOCUMENTS

2016/0003938 A1* 1/2016 Gazit ................. G01S 13/02
                                                                342/81
2018/0136327 A1* 5/2018 Lee ................... G01S 13/931
2019/0173196 A1* 6/2019 Achour ............... G01S 13/426

OTHER PUBLICATIONS

Mosalanejad et al., "Multi-Layer PCB Bow-Tie Antenna Array for (77-81) GHz Radar Applications," IEEE Transactions on Antennas and Propagation, vol. 68, No. 3, Mar. 2020, pp. 2379-2386.
Unknown, "Monopulse Radar," https://en.wikipedia.org/wiki/Monopulse_radar (last accessed Mar. 4, 2020, pp. 1-8).

* cited by examiner

SYSTEMS AND METHODS FOR A RADAR SYSTEM USING SECTIONAL THREE-DIMENSIONAL BEAMFORMING

TECHNICAL FIELD

The subject matter described herein relates, in general, to a radar system, and, more particularly, to a radar system that scans a surrounding environment of a vehicle using sectional three-dimensional beamforming.

BACKGROUND

Vehicles may be equipped with sensors that facilitate perceiving other vehicles, obstacles, pedestrians, and additional aspects of a surrounding environment. For example, a radar sensor of a vehicle may scan the surrounding environment. Logic associated with the radar may analyze acquired data to detect the presence of objects and other features of the surrounding environment. In further examples, additional/alternative sensors such as cameras may be implemented to acquire information about the surrounding environment from which a system derives awareness about aspects of the surrounding environment. This sensor data can be useful in various circumstances for improving perceptions of the surrounding environment so that systems such as automated driving systems can perceive the noted aspects and accurately plan and navigate accordingly.

In general, the further that a vehicle develops awareness about a surrounding environment, the better a driver can be supplemented with information to assist in driving and/or the better an automated system can control the vehicle to avoid hazards. In one approach, a radar system may scan an environment to provide information for safety, motion planning, steering, navigation, or the like for automated driving. For example, the radar system may use a beam for a lateral two-dimensional scan of the surrounding environment for hazards or objects. Logic associated with the radar system may analyze acquired data to detect the presence of objects and other features of the surrounding environment. A two-dimensional scan may sometimes overlook objects or generate false positives due to hills, rough terrain, anomalous driving environments, urban environment, or the like.

Accordingly, a radar system using three-dimensional scanning may detect objects more accurately than two-dimensional scanning during automated driving. However, radar systems using three-dimensional scanning during automated maneuvers may be incapable of adapting beams to detect complex objects in a surrounding environment. In addition, radar systems using three-dimensional scanning hardware may not fit the criteria for integration within a vehicle.

SUMMARY

In one embodiment, example systems and methods relate to a vehicle radar system that scans a surrounding environment for objects during automated driving using sectional three-dimensional scanning and beamforming. Vehicle radar sensors may be ineffective at detecting certain objects depending upon a driving maneuver or a driving environment. In various implementations, current two-dimensional radar systems may be ineffective at detecting complex objects particularly due to hilly roads, curvy roads, anomalous driving environments, urban environments, or the like. Therefore, in one embodiment, a vehicle radar system may scan using multiple sectional three-dimensional beams to gather data about the surrounding environment and field-of-view for object detection. In one approach, the radar system may scan using a layered array of end-fire antennas that adapt beam resolution and the field-of-view during automated driving. Each layer may also include a receiver and transmitter to facilitate adaptive and independent scanning of objects using various three-dimensional beams. Furthermore, the radar system may scan the driving environment using sectional adaptive beamforming by independently controlling each sub-beam from a section of the layered array of end-fire antennas. In one approach, the radar system may precisely track complex objects with the sectional adaptive beamforming by using fine three-dimensional beams and at least one end-fire antenna. Thus, the radar system improves detection and tracking of complex objects by scanning an environment using multiple three-dimensional beams formed by the layered array of end-fire antennas and independently controlled sections.

In one embodiment, a radar system for scanning a surrounding environment of a vehicle during automated driving is disclosed. The radar system includes one or more processors and a memory communicably coupled to the one or more processors. The memory stores a scanning module including instructions that when executed by the one or more processors cause the one or more processors to detect an object by using a three-dimensional beam formed by a layered array of end-fire antennas. The scanning module further includes instructions to scan the object by using a fine three-dimensional beam formed by a section of the layered array of end-fire antennas. The memory stores a tracking module including instructions that when executed by the one or more processors cause the one or more processors to track the object by using the fine three-dimensional beam.

In one embodiment, a non-transitory computer-readable medium for scanning a vehicle's surrounding environment by radar during automated driving and including instructions that when executed by one or more processors cause the one or more processors to perform one or more functions is disclosed. The instructions include instructions to detect an object by using a three-dimensional beam formed by a layered array of end-fire antennas. The instructions also include instructions to scan the object by using a fine three-dimensional beam formed by a section of the layered array of end-fire antennas. The instructions also include instructions to track the object by using the fine three-dimensional beam.

In one embodiment, a method for scanning a surrounding environment of a vehicle by radar during automated driving is disclosed. In one embodiment, the method includes detecting an object by using a three-dimensional beam formed by a layered array of end-fire antennas. The method also includes scanning the object by using a fine three-dimensional beam formed by a section of the layered array of end-fire antennas. The method also includes tracking the object by using the fine three-dimensional beam.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with a radar system that scans a surrounding environment using sectional three-dimensional beamforming are disclosed herein. In one embodiment, the radar system may use a layered antenna array to adaptively detect, scan, and track an object by independent three-dimensional beamforming. The radar system may generate a three-dimensional beam to use for substantially simultaneous vertical and horizontal scanning of the object. The radar system may also generate multiple independent three-dimensional beams by using different layers that each include a transmitter and receivers for independent scanning. In one approach, the radar system may synchronize the layers for scanning cooperation using a distributed local oscillator and end-fire antennas to reduce the system frontal surface area according to vehicle size guidelines. Furthermore, the radar system may generate various beams by independently controlling the layers to adjust scanning resolution and field-of-view that improve the detection of complex objects. In this way, the radar system uses three-dimensional scanning and independent control of a layered antenna array to improve detection, scanning, and tracking of objects during automated driving through different driving environments for increased reliability and safety.

Moreover, the radar system may detect, scan, and track complex objects by adjusting beam resolutions and the field-of-view to various terrains. For example, the radar system may use higher layers of a layered antenna array to improve object detection on an incline of a hilly road. The radar system may use lower layers of the layered antenna array to improve object detection on a decline of a hilly road. In another example, the radar system may also use finer resolution scanning for longer range scanning according to elevation changes. Concerning curvy roads with short road segments, the radar system may use a wide-beam to improve detection of the short road segments. Thus, the radar system may adapt scanning by selectively using layers of the antenna array at various resolutions, thereby improving safety and control during automated driving.

Figure 1:
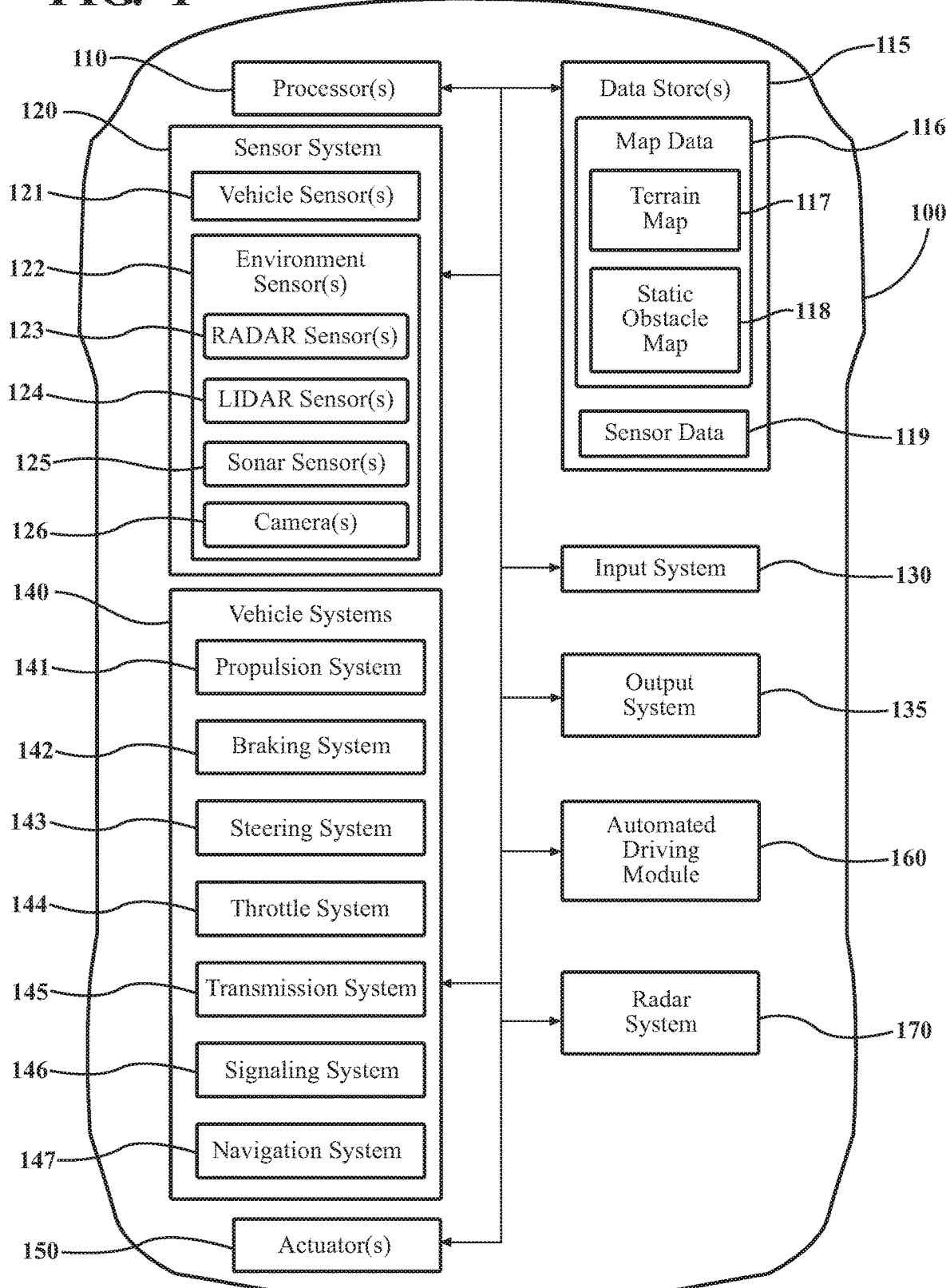
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with a radar system that detects, scans, and tracks an object in a surrounding environment using sectional three-dimensional beamforming.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-10 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a radar system 170 that is implemented to perform methods and other functions as disclosed herein relating to improving detecting, scanning, and tracking an object in a surrounding environment using sectional three-dimensional beamforming.

Figure 2:
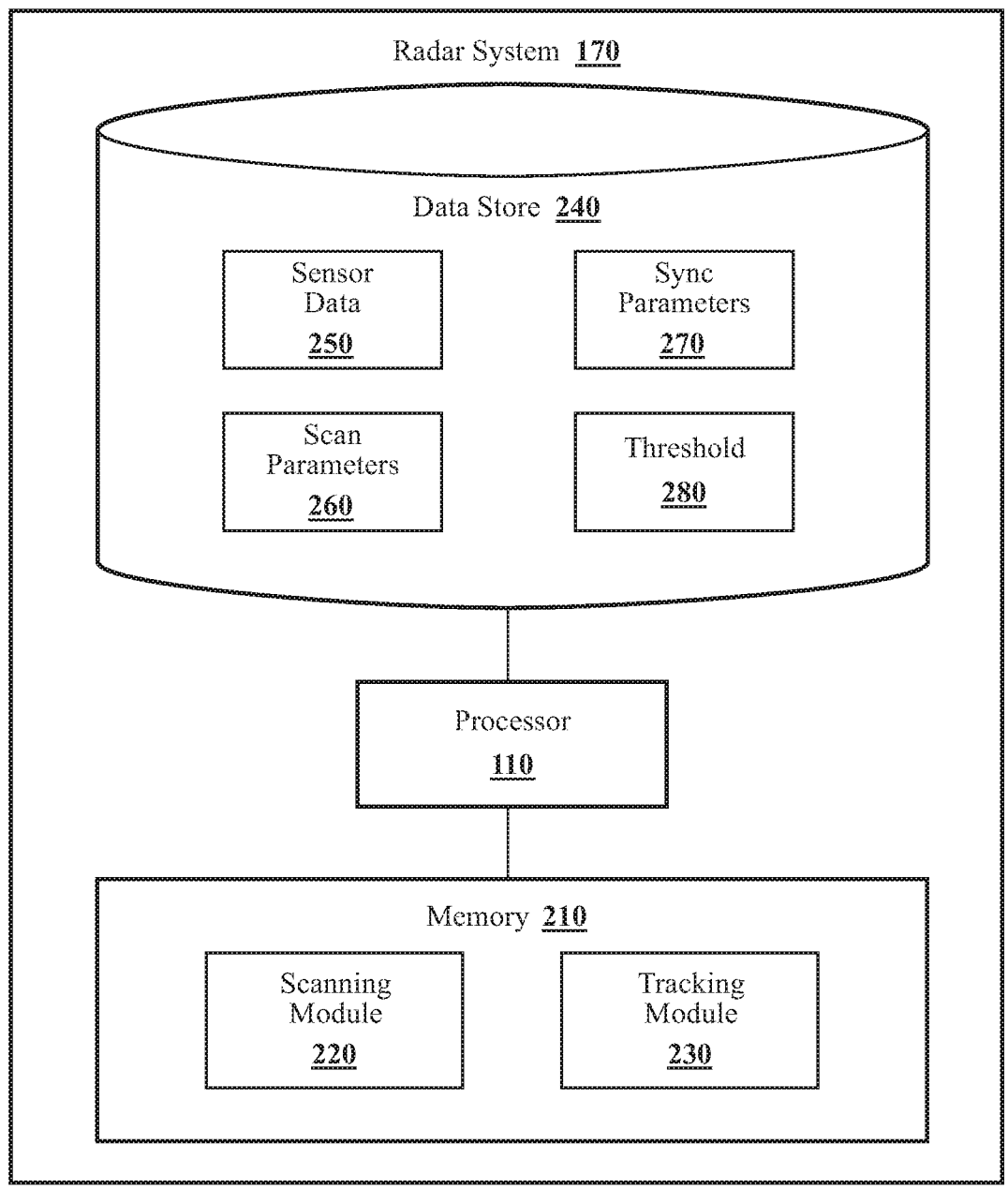
FIG. 2 illustrates one embodiment of a radar system that is associated with adaptively detecting, scanning, and tracking an object in a surrounding environment during automated driving.

FIG. 2 illustrates one embodiment of the radar system 170 that is associated with adaptively detecting, scanning, and tracking an object in a surrounding environment during automated driving. The radar system 170 is shown as including a processor 110 from the vehicle 100 of FIG. 1. Accordingly, the processor 110 may be a part of the radar system 170, the radar system 170 may include a separate processor from the processor 110 of the vehicle 100, or the radar system 170 may access the processor 110 through a data bus or another communication path. In one embodiment, the radar system 170 includes a memory 210 that stores a scanning module 220 and a tracking module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

The radar system 170, as illustrated in FIG. 1, is generally an abstracted form of the radar system 170 that includes the scanning module 220 and the tracking module 230. The scanning module 220 may generally include instructions that function to control the processor 110 to receive data inputs from one or more sensors of the vehicle 100. The inputs are, in one embodiment, observations of one or more objects in an environment proximate to the vehicle 100 and/or other aspects about the surroundings.

In the forthcoming examples, the radar system 170 operation or configurations are given within the context of a vehicle. In particular, the radar system 170 adaptively detecting, scanning, or tracking complex objects may improve the safety and reliability of automated driving. However, the radar system 170 adaptively detecting, scanning, or tracking complex objects may apply to any conveyance, transportation system, mobile device, or the like. For example, the radar system 170 may be used by an unmanned aerial vehicle (UAV) to detect objects proximate to a runway for an automated landing. Furthermore, the radar system 170 may also be arranged, or the like for guidance, motion planning, or the like.

In one approach, the scanning module 220 and the tracking module 230 may increase the resolution and precision for tracking the object by using multiple fine three-dimensional beams. The radar system 170 may generate a three-dimensional beam to use for substantially simultaneous vertical and horizontal scanning to improve detection of irregularly shaped objects. The radar system 170 increasing the fineness of a three-dimensional or other beam may include focusing a beam by reducing either the vertical or the horizontal beam-width. In one approach, the radar system 170 may increase the resolution of multiple beams using a distributed local oscillator and radio frequency front-end to independently control each layer. In this way, the radar system 170 may adaptively use multiple adaptive beams from independent sub-radar systems to improve object detection for automated driving particularly during inclement weather, travel on dangerous roads, poor visibility, or the like.

Moreover, the scanning module 220, in one embodiment, may control the respective sensors to provide the data inputs in the form of the sensor data 250. Additionally, while the scanning module 220 is discussed as controlling the various sensors to provide the sensor data 250, in one or more embodiments, the scanning module 220 can employ other techniques to acquire the sensor data 250 that are either active or passive. For example, the scanning module 220 may passively sniff the sensor data 250 from a stream of electronic information provided by the various sensors to further components within the vehicle 100. Moreover, the scanning module 220 can undertake various approaches to fuse data from multiple sensors when providing the sensor data 250 and/or from sensor data acquired over a wireless communication link. Thus, the sensor data 250, in one embodiment, may represent a combination of perceptions acquired from multiple sensors.

In addition to locations of surrounding objects, the sensor data 250 may also include, for example, information about lane markings, and so on. Moreover, the scanning module 220, in one embodiment, may control the sensors to acquire the sensor data 250 about an area that encompasses 360 degrees of the vehicle 100 in order to provide a comprehensive assessment of the surrounding environment. Of course, in alternative embodiments, the scanning module 220 may acquire the sensor data about a forward direction alone when, for example, the vehicle 100 is not equipped with further sensors to include additional regions about the vehicle and/or the additional regions are not scanned due to other reasons.

Moreover, in one embodiment, the radar system 170 includes a data store 240. In one embodiment, the data store 240 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

In one embodiment, the data store 240 may further include the scan parameters 260, the sync parameters 270, and the threshold 280. In one approach, the radar system 170 and the scanning module 220 may detect an object by using the scan parameters 260 or the sync parameters 270 to adaptively generate a three-dimensional beam, a fine three-dimensional beam, a three-dimensional sub-beam, a fine three-dimensional sub-beam, or the like. For example, the scanning module 220 may adapt scanning according to a beam direction, a beam shape, a velocity of the vehicle 100, a relative angle to the vehicle 100, a distance, a ground height, or the like specified by the scan parameters 260. The scan parameters 260 may also be associated with the type of the surrounding environment of the vehicle 100. In this way, object detection is improved by the scanning module 220 adapting according to the scan parameters 260.

Moreover, the radar system 170 may use the sync parameters 270 to independently control each stack or layer of the layered antenna array to generate sub-beams for the vehicle 100. The radar system 170 may increase detection resolution for more accurate, precise, or focused beams using synchronization among more than one layer. In one approach, the sync parameters 270 may specify time-slot sizes, backoff periods, time-slot periods, phase values, offsets, or the like for scheduling or generating beams. In one approach, the radar system 170 may schedule beams for adaptively detecting, scanning, or tracking of objects according to the sync parameters 270. In this way, the radar system 170 may independently control each layer or a stack as explained in more detail below.

Furthermore, the scanning module 220 or the tracking module 230 may use the threshold 280 for object detection. The threshold 280 may include parameters such a width tolerance, a height tolerance, perimeter margins, or the like for an object. In one approach, the scanning module 220 or the tracking module 230 may use one or more of these parameters to analyze or determine the shape or boundary of a complex object.

In one embodiment, the scanning module 220 is further configured to perform additional tasks beyond controlling the respective sensors to acquire and provide the sensor data 250. For example, the scanning module 220 may include instructions that cause the processor 110 to detect a complex object in a field-of-view using a three-dimensional beam formed by a layered array of end-fire antennas. Although the examples herein may use end-fire antennas, the radar system 170 may use any antenna type or array to detect, scan, and track an object in a surrounding environment using sectional three-dimensional beamforming. Furthermore, although the examples herein may illustrate a certain number of layers or antenna elements, the radar system 170 may use any number of layers or antenna elements to adaptively detect, scan, and track an object.

The scanning module 220 may analyze sensor data 250 to detect a complex object according to the scan parameters 260 and the sync parameters 270. For example, the scanning module 220 may detect the complex object on a hilly road by using an elevated focused three-dimensional beam. Once detected, the scanning module 220 may use a fine three-dimensional beam generated by the layered array of end-fire antennas. As further explained herein, the radar system 170 may be arranged as a layered antenna array by combining multiple radars to achieve a desirable volume and minimal frontal surface area for the vehicle 100. The tracking module 230 may track the complex object using the fine three-dimensional beam. In this way, the radar system 170 adapts beams for detecting, scanning, and tracking complex objects, thereby improving the safety and reliability of automated driving.

Furthermore, the tracking module 230 includes instructions that cause the processor 110 to track a complex object during automated driving using the fine three-dimensional beam. The tracking module 230 may track the complex object according to the sync parameters 270. For example, the tracking module 230 may track the complex object with multiple fine three-dimensional beams for the next X timeslots at the vehicle speed of Y. In one approach, the tracking module 230 may use a distributed local oscillator to control the multiple fine three-dimensional beams generated from one or more layers of the layered antenna array. In this way, the tracking module 230 adapts tracking complex objects according to the speed of vehicle 100, thereby improving the performance and safety of automated driving.

Figure 3:
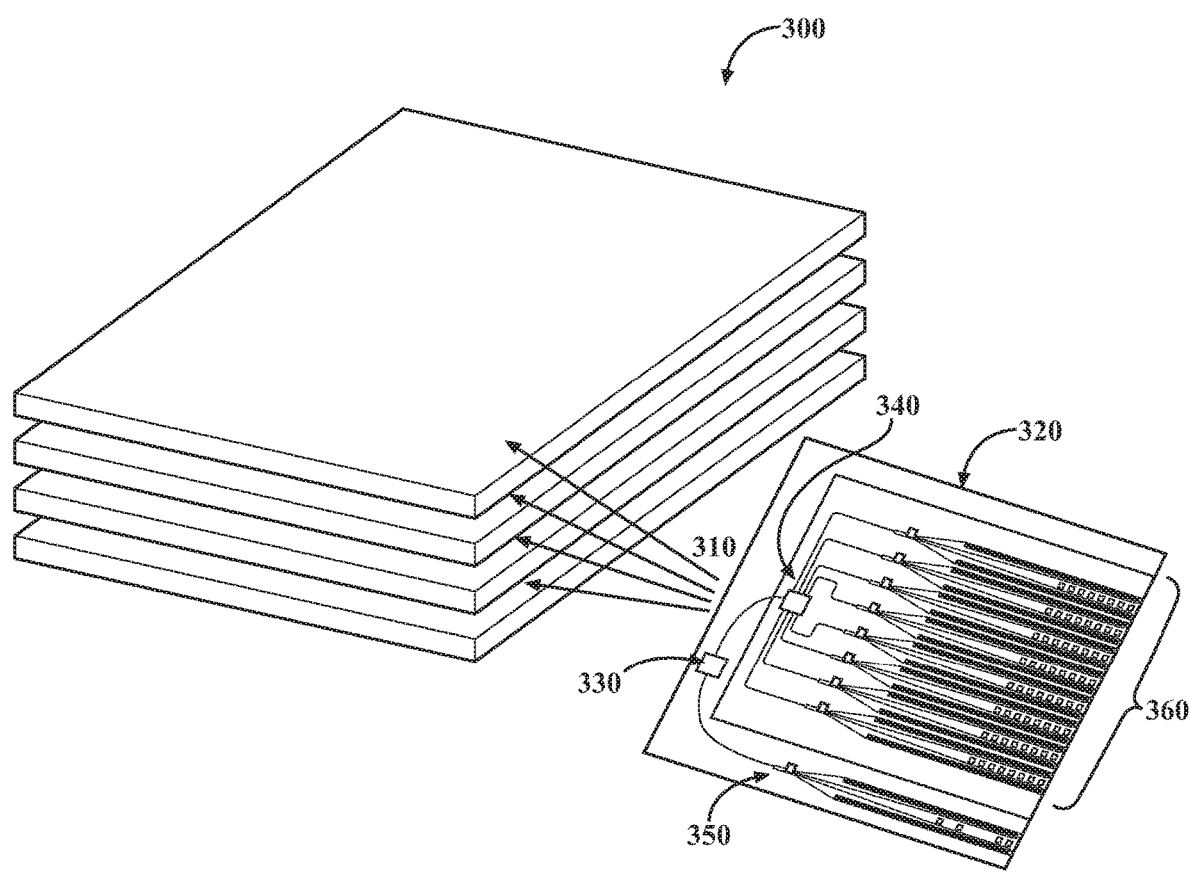
FIG. 3 illustrates an embodiment of a layered array of end-fire antennas such that each layer may include a transmitter and receivers for independent scanning.

Turning to FIG. 3, an embodiment is illustrated of a layered array of end-fire antennas. In the radar component 300, each layer may include a transmitter and receivers to facilitate independent operation and scanning. In one approach, the radar system 170 may be integrated into or combined with the radar component 300. As an example, the radar component 300 may include a layered antenna array 310 of N stacks or layers.

For the radar component 300, in one approach, each stack or layer 320 may use a distributed local oscillator 330 that communicates with the radar control component 340 to control a plurality of end-fire antenna receivers 360. The plurality of end-fire antenna receivers 360 may scan objects using three-dimensional beams to improve object detection speed and resolution. In the radar component 300, each stack or layer may also include an end-fire transmitter antenna 350 so that each stack operates substantially independently or equally for transmit and receive mode during scanning. In one approach, the radar component 300 may detect and track a complex object by using three-dimensional mono-pulse beams generated by end-fire antennas. The radar component 300 may be able to detect certain objects faster using the directionality and power profiles of mono-pulse beams.

Additional aspects of a radar system adaptively detecting, scanning, and tracking an object will be discussed in relation to FIG. 4. that illustrates one embodiment of a method that is associated with adaptively detecting, scanning, and tracking an object in a surrounding environment during automated driving. The method 400 will be discussed from the perspective of the radar system 170 of FIGS. 1 and 2. While the method 400 is discussed in combination with the radar system 170, it should be appreciated that the method 400 is not limited to being implemented within the radar system 170 but is instead one example of a system that may implement the method 400.

As a brief introduction to the method 400, prior to the discussion of the explicitly identified functions, the radar system 170 may adaptively detect, scan, and track an object to improve automated driving. For example, the scanning module 220 may detect the object during inclement weather using a horizontal three-dimensional beam generated by end-fire antennas in a section of a layered antenna array. The radar system 170 may use the layered antenna array for scalability of sectional beamforming and scanning of multiple objects. In particular, the layered antenna array using mono-pulse horizontal and vertical scanning may improve independent tracking of objects by generating numerous adaptive beams to distinguish multiple objects in different driving environments. Although the examples herein may use mono-pulse or end-fire antennas, the radar system 170 may use various antenna types or arrays to detect, scan, and track an object in a surrounding environment using sectional three-dimensional beamforming.

Furthermore, in one approach, the radar system 170 may use at least one end-fire antenna of each layer for sectional scanning objects. End-fire antennas may be particularly useful for objects in the direct line-of-sight of the vehicle 100. For example, the radar system 170 may detect a complex object in the direct line-of-sight during foggy conditions using multiple fine, three-dimensional beams. In addition, the radar system 170 using end-fire antennas in a layered array may desirably reduce volume, package sizes, and reduce frontal surface area of the system. In one approach, in any of the examples given herein, the radar system 170 may use sensor system 120, GPS information, or the like to adapt beams according to the terrain. In this way, the radar system 170 may adapt detection, scanning, and tracking of objects using independent three-dimensional beams according to the driving environment of the vehicle 100, thereby improving the reliability of automated driving.

Figure 4:
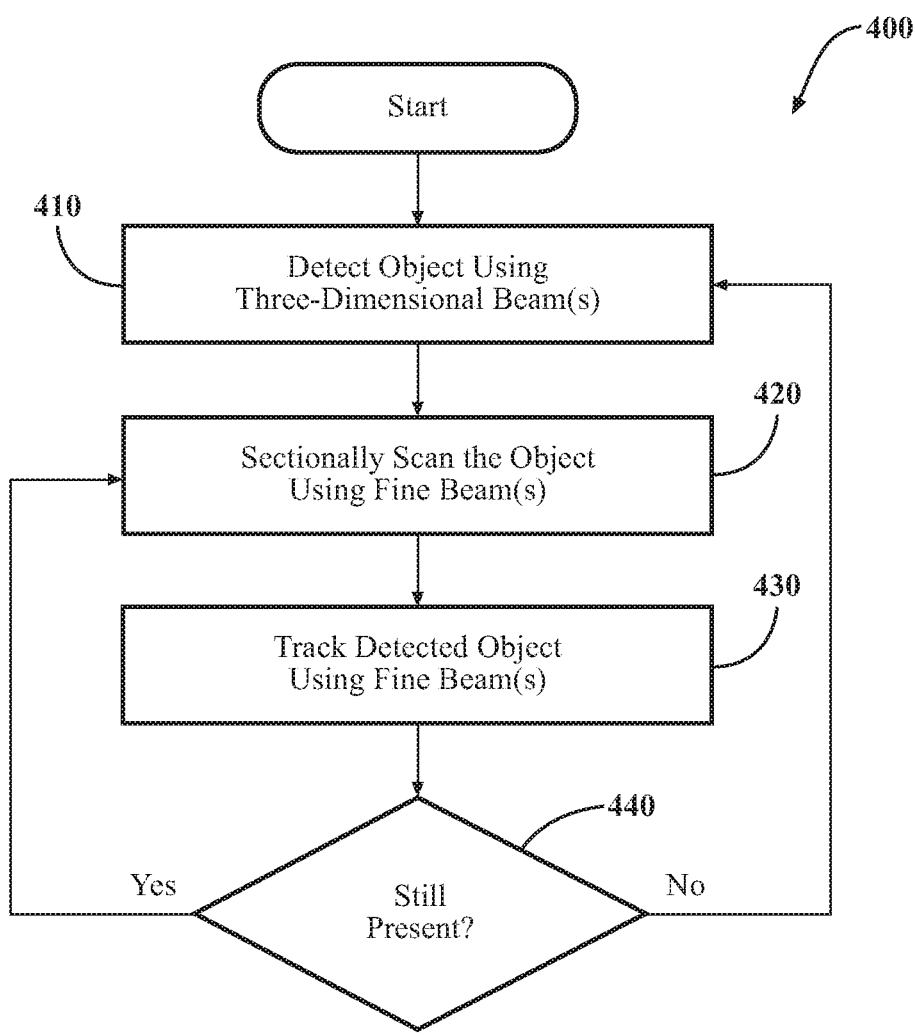
FIG. 4 illustrates one embodiment of a method that is associated with a radar adaptively detecting, scanning, and tracking an object in a surrounding environment during automated driving.

Referring again to radar adaptively detecting, scanning, and tracking an object within a vehicle in FIG. 4, at 410 the radar system 170 and scanning module 220 may detect an object using one or more three-dimensional beams. In one approach, the radar system 170 may perform dynamic coarse, rough, or fast scanning of an environment for object detection by using three-dimensional beams. The radar system 170 may generate the three-dimensional beams using a layered antenna array for flexible and adaptive beamforming. In one approach, the radar system may generate a three-dimensional beam to use for substantially simultaneous vertical and horizontal scanning of the object to improve detection of irregularly shaped objects. Furthermore, the radar system 170 may indicate an object as detected according to the satisfaction of one or more parameters of the threshold 280. The radar system 170 as such may generate a three-dimensional beamforming plan and schedule to quickly detect the object. In one approach, the automated driving module(s) 160 may use the quick or coarse detection to adapt a motion plan, driving maneuver, speed, or the like during hazardous conditions.

At 420, the radar system 170 may schedule beams in the layered antenna array to sectionally scan the object using fine beam(s). In one approach, the radar system 170 may perform sectional scanning as explained in detail in FIG. 6 to achieve flexible three-dimensional beamforming among and between different layers or stacks. For example, each layer or stack of the layered antenna array may be configured for a phased-array sectional scanning in a lateral or vertical direction for three-dimensional beams. The radar system 170 may use a local oscillator input shared or synchronized with each stack to independently control beams of the multiple layers to scan a field-of-view. For example, the shared local oscillator may facilitate and coordinate scanning different three-dimensional beams using a time-slot based scheduling. In this way, the radar system 170 may use diverse beams in a coordinated and synchronized manner to precisely track an object, thereby improving automated driving.

At 430, the radar system 170 and the tracking module 230 may track the object using the fine beam(s). In one approach, the tracking module 230 may track the object according to the sync parameters 270. The sync parameters 270 may specify time-slot sizes, backoff periods, time-slot periods, phases, offsets, or the like for forming or scheduling beams. The tracking module 230 may also use a distributed local oscillator to control and schedule the multiple fine three-dimensional beams generated from one or more layers of the layered antenna array. For example, the tracking module 230 may adaptively use a lateral three-dimensional beam on stack 1 for time-slot 1 to follow the horizontal presence of an object, such as a tree. The tracking module 230 may use a vertical three-dimensional beam on stack 2 for time-slot 2 to follow the vertical presence of the tree. In this example, the radar system 170 can independently identify the shape of a tree with more flexibility to improve overall system performance.

At 440, the radar system 170 and the tracking module 230 may determine if the object is still present according to the satisfaction of criteria or a threshold. The radar system 170 may stop tracking according to the distance to the object, decreased boundary resolution of the object, or the like. In one approach, the radar system 170 may also stop tracking according to one or more parameters specified in the threshold 280. As described above, the threshold 280 may include parameters such a width tolerance, a height tolerance, perimeter margins, or the like for an object. In this way, the radar system 170 may improve scanning by focusing resources and scheduling to objects in the field-of-view.

Figure 5:
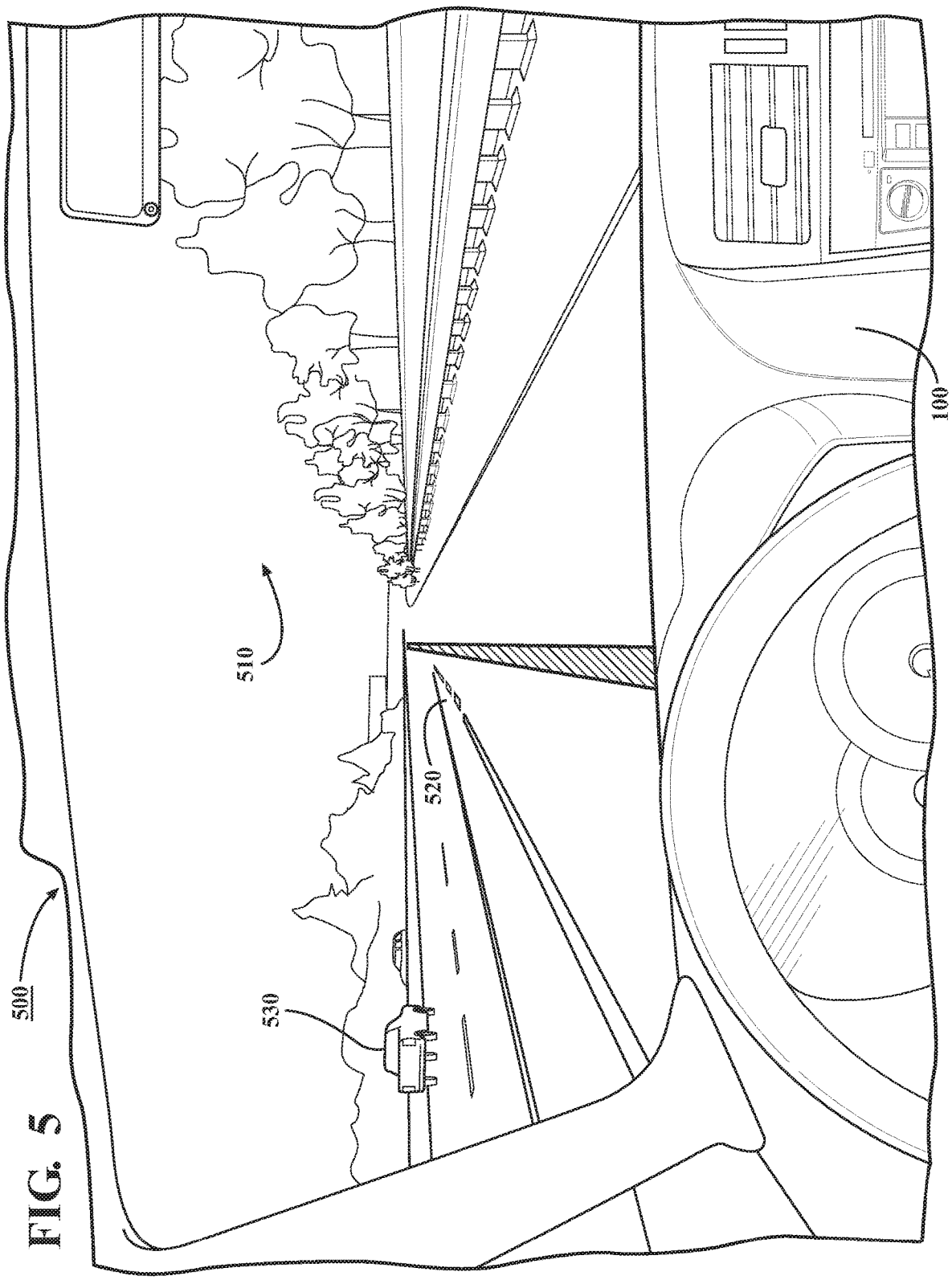
FIG. 5 is a diagram that illustrates a vehicle driving environment with a vehicle that adaptively detects, scans, and tracks an object using a layered array of end-fire antennas.

Turning now to FIG. 5, the diagram illustrates a vehicle driving environment with a vehicle that adaptively detects, scans, and tracks an object 500 using a layered array of end-fire antennas. In FIG. 5, the radar system 170 may be integrated into vehicle 100 to adapt beams for detection, scanning, and tracking of objects during automated driving according to location, driving complexity, driving conditions, states, or the like on an expressway. The driving environment 510 may include the vehicle 100 traveling on the expressway 520.

In one approach, the radar system 170 may detect the vehicle 530 using coarse or fast scanning by a single focused three-dimensional beam generated by one or more end-fire antennas. The radar system 170 may subsequently generate two independent and narrow lateral beams from different stacks of the layered antenna array for fine scanning and tracking of the vehicle 530. The radar system 170 using two independent and narrow lateral beam from different stacks may improve fine tracking of the vehicle 530 at higher speeds on the expressway 520. For example, the radar system 170 may determine the boundaries of the vehicle 530 by the fine tracking within the threshold category for the vehicle 530. In this way, vehicle 100 may quickly detect and finely track the vehicle 530, thereby improving safety of automated driving during high speeds on an expressway.

Figure 6:
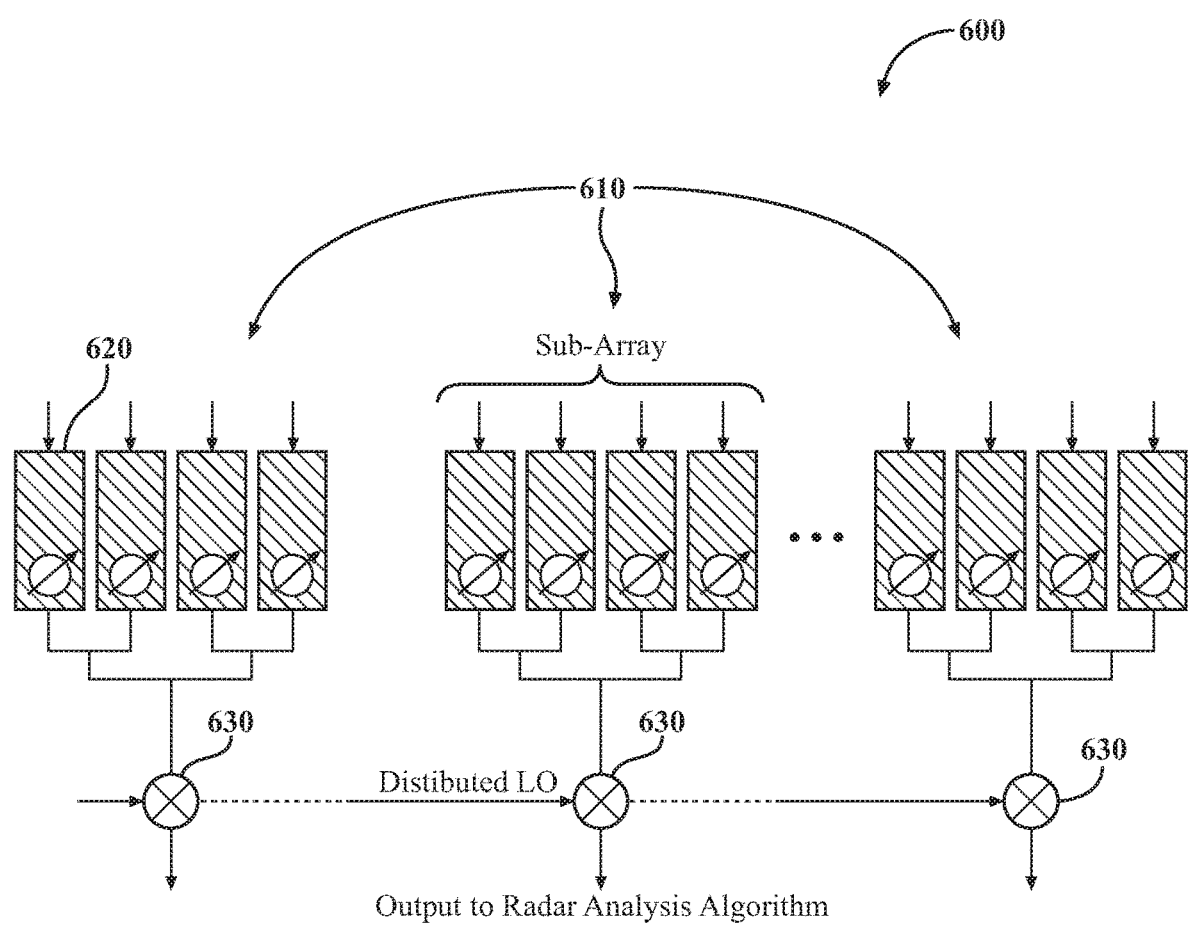
FIG. 6 illustrates one embodiment of a phased sub-array to generate fine beams using a distributed local oscillator to independently control sectional sub-arrays.

FIG. 6 illustrates one embodiment of using a phased sub-array to generate fine beams with a distributed local oscillator to independently control sectional sub-arrays. The radar component 600 may include one or more sub-arrays 610. For example, the radar component 600 may have three sub-arrays that each have the four-phase shifters 620 to scan objects. In one approach, each phase shifter may represent an antenna element. In certain configurations, the radar component 600 arrangement may be configured as a digital or a hybrid radar system.

Furthermore, the radar component 600 may use each sub-array to generate or form three independent sub-beams for fine scanning an object. The radar component 600 may combine energy from the three sub-arrays to increase precision or accuracy. In one approach, the radar component 600 may use a distributed local oscillator 630 to collect data of the surrounding environment and perform digital beamforming. The output of the radar component 600 may be used by a radar analysis algorithm associated with the vehicle 100 for object detection. For example, the automated driving module(s) 160 may analyze the output to perform motion planning, maneuvers, braking, steering, or the like associated with automated driving of the vehicle 100.

Figure 7:
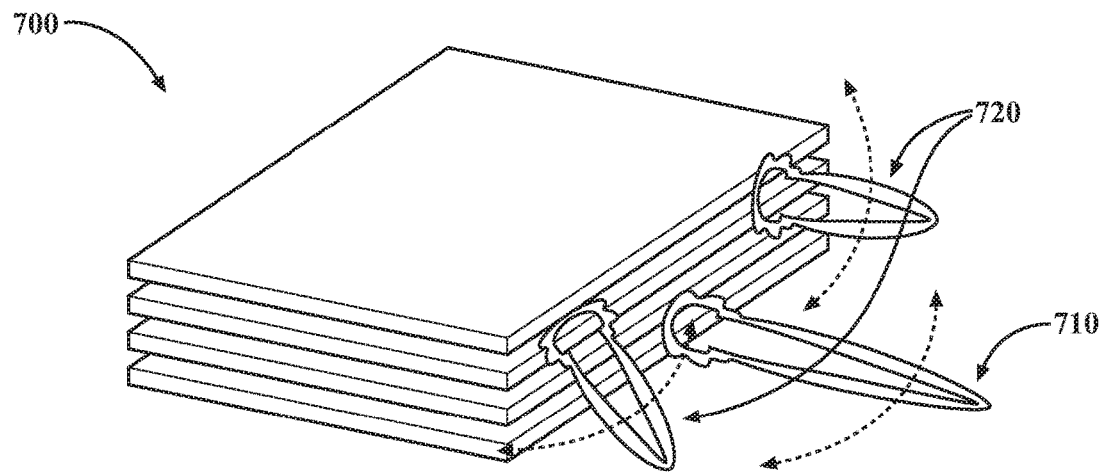
FIG. 7 illustrates an example of stacked layers of antenna arrays to generate multiple sub-beams independently on each stack.
Figure 7:
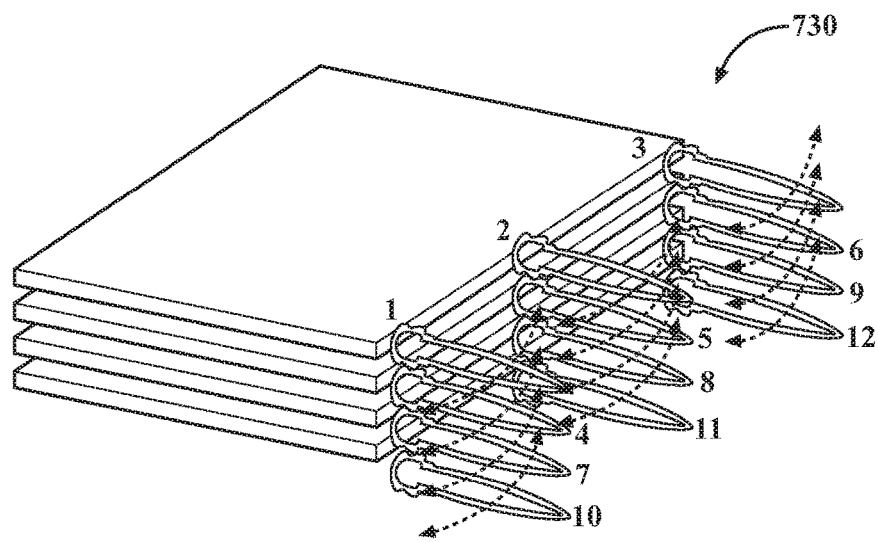
Figure 7:
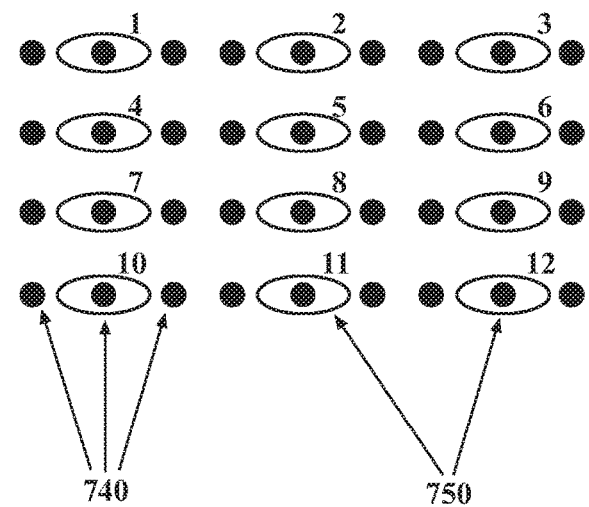

Forthcoming in FIGS. 7-10 are examples of radar scanning operations in a surrounding environment of a vehicle using sectional three-dimensional beamforming to improve detecting, scanning, or tracking of an object during automated driving in accordance with configurations given herein. FIG. 7 illustrates an example of stacked layers of antenna arrays to generate multiple sub-beams independently on each stack. The radar scanning operation 700 may generate beams 710 and 720 using end-fire antennas. In one approach, radar scanning may describe an operation where an array of receiver antennas scan for reflections or feedback off objects in the environment according to transmissions by a transmitter. The beams 710 and 720 may be mono-pulse beams that flexibly detect an object in any direction. In one approach, the radar scanning operation 700 may use a mono-pulse sum operation of beam amplitude and phase at a higher layer of the stacked antenna array to form SUM beams 710 according to the location of the object. A higher layer of the stacked antenna array may combine beams by a delta subtraction of beam amplitude and phase to form DELTA beams 720 according to the location of the object.

Concerning layer beam formation, the radar scanning operation 700 may independently generate and control the twelve sub-beams 730 since each layer includes a transmitter and receiver controlled by a distributed local oscillator. The twelve beams may also be formed by the radar scanning operation 700 using independent mixing and down conversion on a sub-array basis. In the radar scanning operation 700, the distributed local oscillator may allow the generation of various and multiple beams through synchronization and scheduling. In this way, the radar scanning operation 700 may improve scanning accuracy by distinguishing an object in between the twelve mono-pulse beams.

In radar scanning operation 700, an arrangement of four layers may each have groups of three antenna elements 740 that generate the twelve sub-beams 750. Three antenna elements may be combined to generate a beam. In one approach, the radar scanning operation 700 may compare the combination of sub-beams 1 and 10 to 1, 2, 7, 10 to identify a vertical target direction for an object on a right side of a field-of-view angle. In another approach, a beam in a diagonal direction may be formed by sub-beams 1 and 12 or all 12 sub-beams combined according to the position of an object. The radar scanning operation 700 may repeat combining and analyzing different mono-pulse beams to increase the resolution of multiple objects in the area of both vertical and horizontal directions for fine tracking.

Figure 8:
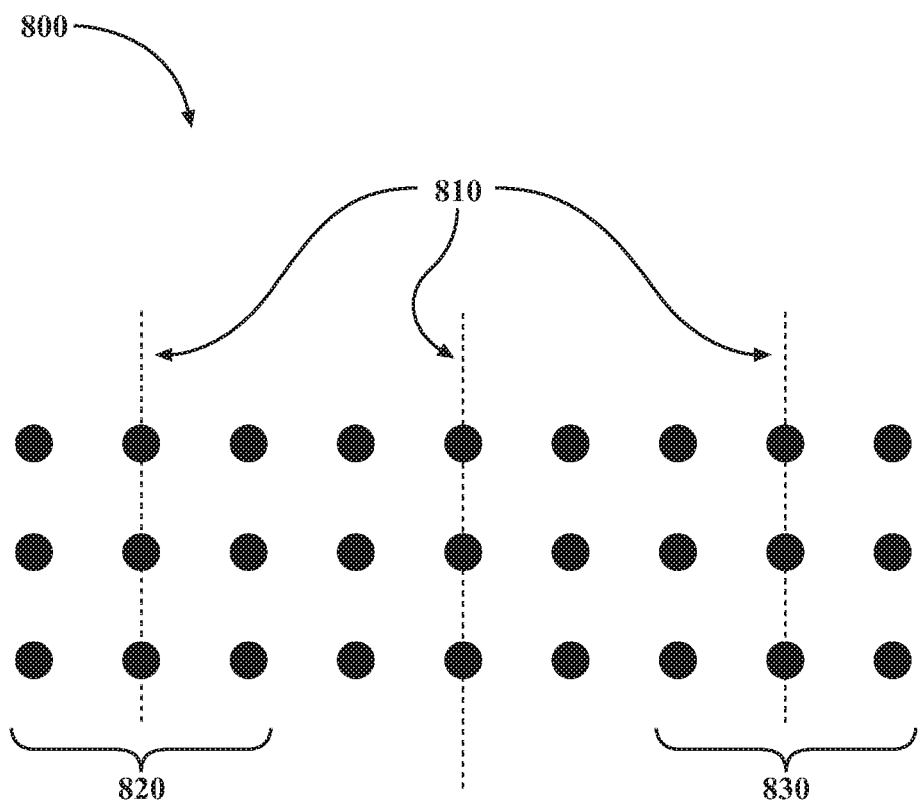
FIG. 8 illustrates an example of a sub-array to scan vertically or horizontally.
Figure 8:
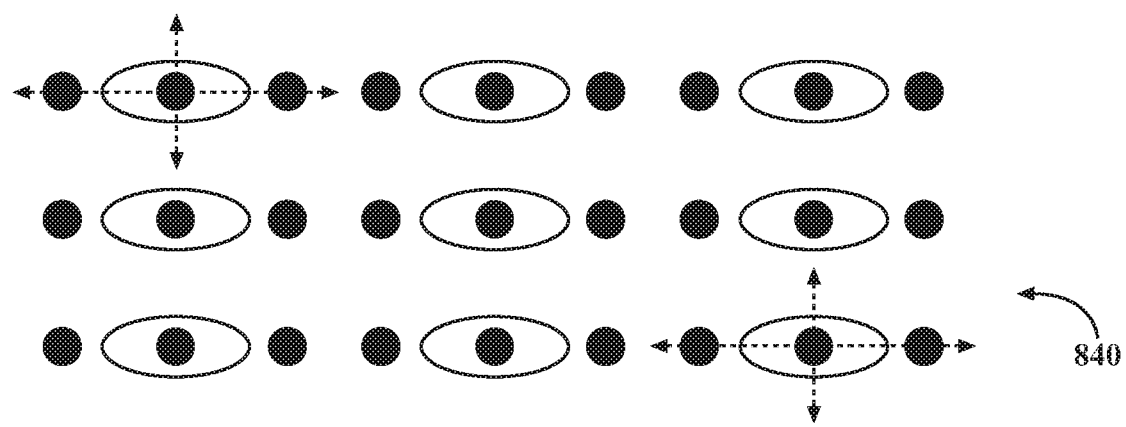

FIG. 8 illustrates an example of a sub-array to scan vertically or horizontally. In the radar scanning operation 800, the beam centers 810 may be associated with the sub-arrays 820 and 830 that may each include three antenna elements. The radar scanning operation 800 may use the three-dimensional beam 840 to independently scan vertically or horizontally using the three-layers. In one approach, the radar scanning operation 800 may iterate object scanning until parameters related to the threshold 280 are satisfied. In this way, the radar scanning operation 800 pattern improves object detection speed by independently scanning vertically or horizontally using three-dimensional beams from the three-layers.

Figure 9:
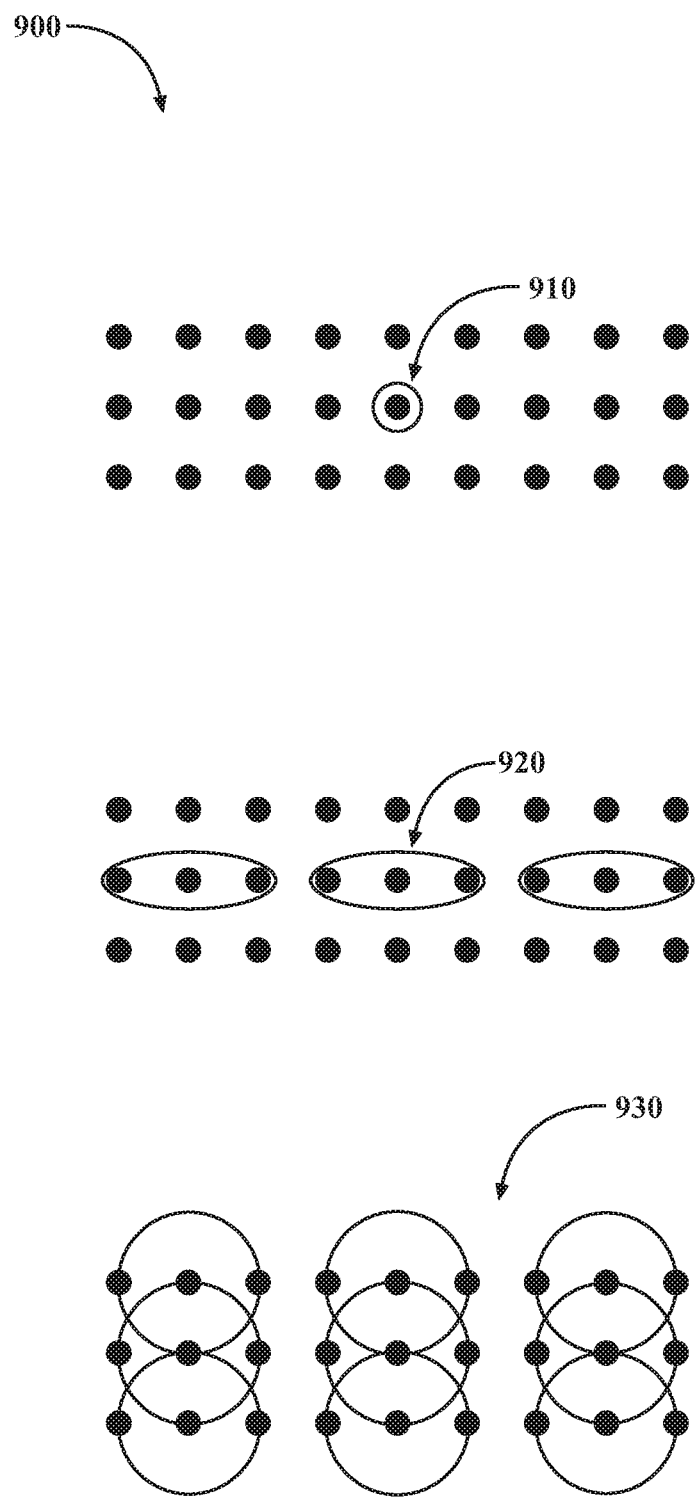
FIG. 9 illustrates an example of that adapts beam concentration according to the driving environment.

FIG. 9 illustrates an example of the radar scanning operation 900 that adapts beam concentration according to the driving environment. In a non-limiting example, the radar scanning operation 900 may comprise three-layers where each layer has nine antenna elements. In one approach, all the antenna inputs of the radar scanning operation 900 may be combined into a single beam 910 by adaptive phase shifting of sub-arrays such as by the radar component 600. The single beam 910 may be a formed receive beam with a narrow half-power beam-width (HPBW). The radar scanning operation 900 may use HPBW for long-range detection of an object distant to the vehicle 100. The long-range detection by the radar scanning operation 900 may have a high angular resolution but a narrow scan field-of-view.

In addition, the radar scanning operation 900 may also generate three independent beams 920 that may be narrow horizontally to scan a wider field-of-view for objects at a mid-range distance to the vehicle 100. In one approach, the radar scanning operation 900 may use mid-range scanning that comprises a medium angular resolution and a wider field-of-view by a three-zone independent scan. A three-zone independent scan may allow the radar system to transfer or handoff tracking of an object by the tracking module 230 between zones. In addition, the radar scanning operation 900 may form nine independent beams 930 to scan vertical areas for the short-mid range of operation. For example, the radar scanning operation 900 may use short-mid range operation for urban environments, intersections, pedestrian clouds, dense population areas, near bicyclists, near pedestrians, or the like.

Figure 10:
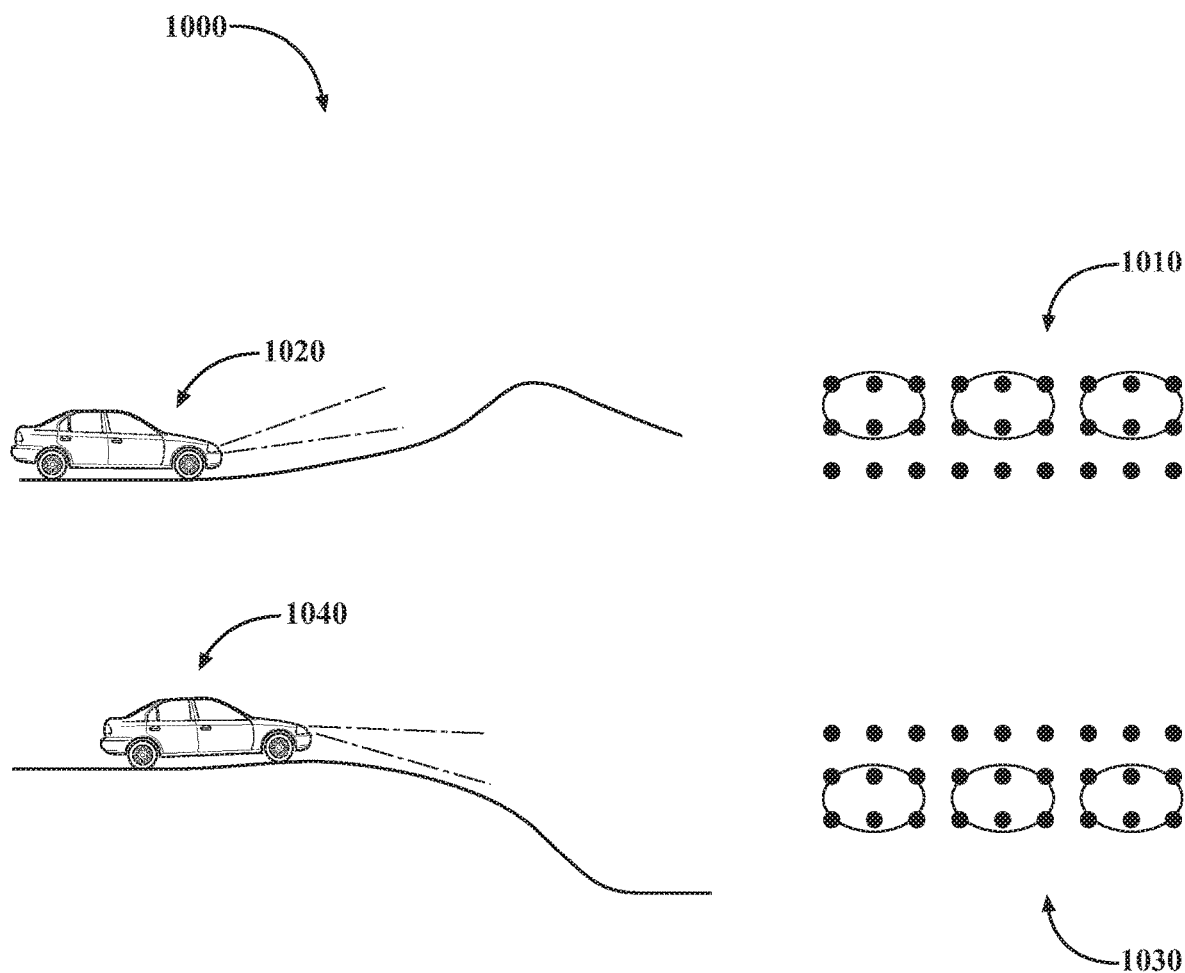
FIG. 10 illustrates an example of independently using different layers of a layered antenna array adapting to road inclines or declines.

FIG. 10 illustrates an example of independently using different layers of a layered antenna array that adapt to road inclines or declines. The radar scanning operation 1000 may generate or form upward-directed beams 1010 from a three-layer antenna array with nine antenna elements per layer. The radar scanning operation 1000 using the group of upward-directed beams 1010 may extend the range for scanning in the uphill driving scenario 1020. The radar scanning operation 1000 may also generate or form the group of downward-directed beams 1030 to extend the range for scanning in the downhill driving scenario 1040. Furthermore, the radar scanning operation 1000 may adapt the upward-directed beams 1010 or the downward-directed beams 1030 according to a flat or variable topography.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application specific integrated circuit (ASIC), a microprocessor, etc. The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s)

117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more light detection and ranging (LIDAR) sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a GPS, a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a GPS, a local positioning system, or a geolocation system.

The processor(s) 110, the radar system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140 and, thus, may be partially or fully autonomous as defined by the society of automotive engineers (SAE) 0 to 5 levels.

The vehicle 100 can include one or more actuators 150. The actuators 150 can be an element or combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the radar system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A radar system for scanning a surrounding environment of a vehicle during automated driving, comprising:
    one or more processors;
    a memory communicably coupled to the one or more processors and storing:
        a scanning module including instructions that when executed by the one or more processors cause the one or more processors to:
            detect an object by using a three-dimensional beam formed by at least two layers from a top section of a layered array having end-fire antennas, wherein each of the at least two layers include a transmitter and a plurality of receivers that are individually controllable;
            scan the object by using a fine three-dimensional beam formed by at least two bottom layers from a bottom section of the layered array having end-fire antennas during a scheduled time-slot; and
        a tracking module including instructions that when executed by the one or more processors cause the one or more processors to:
            track the object by using the fine three-dimensional beam during tracking time-slots scheduled substantially consecutively; and
            estimate a shape of the object from the at least two bottom layers using a first of the tracking time-slots to follow horizontal presence and using a second of the tracking time-slots to follow vertical presence.

2. The radar system of claim 1, wherein the scanning module includes instructions to scan the object further including instructions to generate the fine three-dimensional beam by independent control of the top section using a first sub-array according to increasing elevation associated with the vehicle.

3. The radar system of claim 2, wherein the scanning module includes instructions to scan the object further including instructions to generate a sub-beam by independent control of the bottom section using a second sub-array according to decreasing elevation associated with the vehicle.

4. The radar system of claim 3, wherein the tracking module includes instructions to track the object further including instructions to synchronize the first sub-array and the second sub-array by using a distributed local oscillator to control the fine three-dimensional beam and the sub-beam.

5. The radar system of claim 1, wherein the scanning module includes instructions to scan the object further including instructions to select the scheduled time-slot and the tracking time-slots according to a type of the object, a distance to the object, and a velocity of the vehicle.

6. The radar system of claim 1, wherein the scanning module includes instructions to scan the object further including instructions to generate the three-dimensional beam according to scan parameters that include a beam direction and a beam shape associated with a velocity of the vehicle.

7. The radar system of claim 1, wherein the scanning module includes instructions to scan the object further including instructions to determine coordinates, a relative angle to the vehicle, a distance, and a ground height of the object according to a position of the vehicle.

8. The radar system of claim 1, wherein the scanning module includes instructions to scan the object further including instructions to scan the object continuously by using the fine three-dimensional beam to maintain the vertical presence of the object.

9. The radar system of claim 1, wherein the scanning module includes instructions to detect the object further including instructions to detect the object by satisfaction of a threshold associated with a boundary of the object.

10. A non-transitory computer-readable medium for scanning a surrounding environment of a vehicle by radar during automated driving and including instructions that when executed by one or more processors cause the one or more processors to:
    detect an object by using a three-dimensional beam formed by at least two layers from a top section of a layered array having end-fire antennas, wherein each of the at least two layers include a transmitter and a plurality of receivers that are individually controllable;
    scan the object by using a fine three-dimensional beam formed by at least two bottom layers from a bottom section of the layered array having end-fire antennas during a scheduled time-slot;
    track the object by using the fine three-dimensional beam during tracking time-slots scheduled substantially consecutively; and
    estimate a shape of the object from the at least two bottom layers using a first of the tracking time-slots to follow horizontal presence and using a second of the tracking time-slots to follow vertical presence.

11. The non-transitory computer-readable medium of claim 10, wherein the instructions to scan the object further include instructions to generate the fine three-dimensional beam by independent control of the top section using a first sub-array according to increasing elevation associated with the vehicle.

12. A method, comprising:
    detecting, in a surrounding environment of a vehicle by radar during automated driving, an object by using a three-dimensional beam formed by at least two layers from a top section of a layered array having end-fire antennas, wherein each of the at least two layers include a transmitter and a plurality of receivers that are individually controllable;
    scanning the object by using a fine three-dimensional beam formed by at least two bottom layers from a bottom section of the layered array having end-fire antennas during a scheduled time- slot;
    tracking the object by using the fine three-dimensional beam during tracking time-slots scheduled substantially consecutively; and
    estimating a shape of the object from the at least two bottom layers using a first of the tracking time-slots to follow horizontal presence and using a second of the tracking time-slots to follow vertical presence.

13. The method of claim 12, wherein scanning the object further comprises generating the fine three-dimensional beam by independent control of the top section using a first sub-array according to increasing elevation of the vehicle.

14. The method of claim 13, wherein scanning the object further comprises generating a sub-beam by independent control of the bottom section using a second sub-array according to decreasing elevation associated with the vehicle.

15. The method of claim 14, wherein tracking the object further comprises synchronizing the first sub-array and the second sub-array by using a distributed local oscillator to control the fine three-dimensional beam and the sub-beam.

16. The method claim 12, wherein scanning the object further comprises selecting the scheduled time-slot and the tracking time-slots according to a type of the object, a distance to the object, and a velocity of the vehicle.

17. The method of claim 12, wherein scanning the object further comprises generating the three-dimensional beam according to scan parameters that include a beam direction and a beam shape associated with a velocity of the vehicle.

18. The method of claim 12, wherein scanning the object further comprises determining coordinates, a relative angle to the vehicle, a distance, and a ground height of the object according to a position of the vehicle.

19. The method of claim 12, wherein scanning the object further comprises scanning the object continuously by using the fine three-dimensional beam to maintain vertical presence of the object.

20. The method of claim 12, wherein detecting the object further comprises satisfying a threshold associated with a boundary of the object.

\* \* \* \* \*